(12) United States Patent
Becker et al.

(10) Patent No.: US 10,385,921 B2
(45) Date of Patent: Aug. 20, 2019

(54) COMBINATION BEARING AND SEAL ASSEMBLY FOR ROTATABLE SHAFTS

(71) Applicants: AKTIEBOLAGET SKF, Göteborg (SE); KAYDON RING & SEAL, INC., Baltimore, MD (US)

(72) Inventors: Jeffrey Becker, Jamestown, NY (US); George Haynes, Middle River, MD (US); Craig Krull, Erie, PA (US)

(73) Assignees: Aktiebolaget SKF, Göteborg (SE); Kaydon Ring & Seal, Inc., Baltimore, MD (US)

( * ) Notice: Subject to any disclaimer, the term of this patent is extended or adjusted under 35 U.S.C. 154(b) by 0 days.

(21) Appl. No.: 15/449,236

(22) Filed: Mar. 3, 2017

(65) Prior Publication Data
US 2018/0202494 A1 Jul. 19, 2018

Related U.S. Application Data

(60) Provisional application No. 62/446,771, filed on Jan. 16, 2017.

(51) Int. Cl.
*F16C 33/58* (2006.01)
*F16C 33/76* (2006.01)
(Continued)

(52) U.S. Cl.
CPC .......... *F16C 33/7816* (2013.01); *F01D 25/16* (2013.01); *F16C 33/58* (2013.01);
(Continued)

(58) Field of Classification Search
CPC .................. F16C 33/6677; F16C 33/7816; F16C 33/782; F16C 33/7826; F16C 33/7836;
(Continued)

(56) References Cited

U.S. PATENT DOCUMENTS

| 2,733,081 A | * | 1/1956 | Saywell | F16C 33/785 |
| | | | | 277/580 |
| 4,798,481 A | * | 1/1989 | Frank | F16C 19/163 |
| | | | | 277/397 |

(Continued)

*Primary Examiner* — James Pilkington
(74) *Attorney, Agent, or Firm* — Mark Ussai; SKF USA Inc. Patent Dept.

(57) ABSTRACT

A combination bearing and seal assembly includes a tubular inner body disposable about a shaft so rotate about an axis and has a first outer circumferential surface section providing an inner bearing race and a second outer circumferential surface section spaced axially from the first surface section and providing a seal engagement surface. A tubular outer body is disposed about the inner body and has an inner circumferential surface section providing a bearing outer race and rolling elements are disposed between the two races to form a bearing. A seal member(s) form an annular seal between the inner and outer bodies and is spaced axially from the bearing. The seal member(s) have inner sealing surface(s) engageable with the inner body engagement surface when the inner body is generally stationary and the seal is configured to displace radially outwardly from the engagement surface when the inner body rotates about the axis.

12 Claims, 11 Drawing Sheets

(51) Int. Cl.
*F16C 33/78* (2006.01)
*F16C 33/80* (2006.01)
*F16C 37/00* (2006.01)
*F16J 15/44* (2006.01)
*F16J 15/447* (2006.01)
*F01D 25/16* (2006.01)
*F16J 15/16* (2006.01)

(52) U.S. Cl.
CPC .......... *F16C 33/767* (2013.01); *F16C 33/805* (2013.01); *F16J 15/162* (2013.01); *F16J 15/442* (2013.01); *F16J 15/4472* (2013.01); *F05D 2240/55* (2013.01); *F16C 37/007* (2013.01)

(58) Field of Classification Search
CPC  F16C 33/784; F16C 33/7846; F16C 33/7859; F16C 33/7869; F16C 33/7879; F16C 33/7896; F16C 33/805; F05D 2240/55
See application file for complete search history.

(56) References Cited

U.S. PATENT DOCUMENTS

| | | | | |
|---|---|---|---|---|
| 5,683,186 | A * | 11/1997 | Akimoto | F16C 19/362 384/484 |
| 6,145,843 | A * | 11/2000 | Hwang | F16J 15/442 277/400 |
| 6,872,003 | B2 * | 3/2005 | Dusserre-Telmon | F01D 25/164 384/99 |
| 8,074,995 | B2 * | 12/2011 | Vasagar | F16J 15/3244 277/301 |
| 8,449,201 | B2 * | 5/2013 | Russ | F16C 19/163 277/353 |
| 8,753,015 | B2 * | 6/2014 | Kuo | F16C 19/362 384/447 |
| 8,905,408 | B2 * | 12/2014 | Garrison | F01D 11/02 277/348 |
| 2006/0062504 | A1 * | 3/2006 | Wilton | F01D 25/18 384/475 |

* cited by examiner

COMBINATION BEARING AND SEAL ASSEMBLY FOR ROTATABLE SHAFTS

BACKGROUND OF THE INVENTION

The present invention relates to bearings and seals, and more particularly to bearings and seals used in high speed and/or high temperature applications.

Bearings and seals are each generally known in numerous different types and configurations, such as plain bearings, rolling element bearings, elastomeric lip seals, carbon ring seals, etc. When used in relatively high speed or/and relatively high temperature applications, the bearings are typically rolling element bearings and the seals are often circumferentially sealing carbon ring seals in order to function effectively in such ambient conditions. Typically, a separate ring seal assembly is located adjacent to a bearing assembly to prevent or at least reduce the flow of certain fluids (e.g., steam, combustion products, etc.) into the bearing.

SUMMARY OF THE INVENTION

In one aspect, the present invention is a combination bearing and seal assembly for a shaft, the shaft being rotatable about a central axis, the bearing and seal assembly comprising a generally tubular inner body disposable about and coupleable with the shaft so as to be rotatable about the central axis. The inner body has a first outer circumferential surface section providing an inner bearing race and a second outer circumferential surface section spaced axially from the first outer surface section and providing a seal engagement surface. A generally tubular outer body is disposed generally coaxially about the inner body and has an inner circumferential surface section spaced radially outwardly from the inner body inner surface and providing a bearing outer race. A plurality of rolling elements are disposed between the inner body inner race and the outer body outer race so as to form a bearing. Further, at least one seal member forming a generally annular seal is disposed between the inner and outer bodies and is spaced axially from the bearing. The seal member or members provide an inner circumferential sealing surface sealingly engageable with the inner body seal engagement surface when the inner body is generally stationary with respect to the central axis. The seal is configured to displace generally radially outwardly so as to be spaced from the engagement surface when the inner body rotates about the central axis.

In another aspect, the present invention is again a combination bearing and seal assembly for a shaft as described in the paragraph above and in which the seal includes a plurality of generally arcuate segments each having opposing inner and outer circumferential surfaces and opposing first and second circumferential ends. The first circumferential end of each one of the plurality of seal members is disposed adjacent to the second circumferential end of an adjacent one of the plurality of seal segments. The inner surfaces of the plurality of segments collectively form an inner circumferential sealing surface sealingly engageable with the tubular inner body seal engagement surface.

In a further aspect, the present invention is a combination bearing and seal assembly for a shaft operating in relatively high temperature environment, the shaft being rotatable about a central axis. The bearing and seal assembly comprises a generally tubular inner body disposable about and coupleable with the shaft so as to be rotatable about the central axis. The inner body has a first outer circumferential surface section providing an inner bearing race and a second outer circumferential surface section spaced axially from the first outer surface section and providing a seal engagement surface. A generally tubular outer body disposed generally coaxially about the tubular inner body and having an inner circumferential surface section spaced radially outwardly from the inner body inner surface and providing a bearing outer race. A plurality of rolling elements are disposed between the inner body inner race and the outer body outer race so as to form a bearing. Further, a generally annular seal is disposed between the inner and outer bodies and spaced axially from the bearing. The seal includes a plurality of generally arcuate segments each having opposing inner and outer circumferential surfaces and opposing first and second circumferential ends, the first circumferential end of each one of the plurality of seal members being disposed adjacent to the second circumferential end of an adjacent one of the plurality of seal members. The inner surfaces of the plurality of segments collectively form an inner circumferential sealing surface sealingly engageable with the inner body seal engagement surface. Each seal segment is formed of carbon, ceramic or a high-temperature polymeric material.

In yet another aspect, the present invention is again a combination bearing and seal assembly for a shaft operating in relatively high temperature environment, the shaft being rotatable about a central axis. The bearing and seal assembly comprises a generally tubular inner body disposable about and coupleable with the shaft so as to be rotatable about the central axis and having a first outer circumferential surface section providing an inner bearing race and a second outer circumferential surface section spaced axially from the first outer surface section and having an outside diameter. A generally tubular outer body is disposed generally coaxially about the inner body and has an inner circumferential surface section spaced radially outwardly from the inner body inner surface and providing a bearing outer race. A plurality of rolling elements are disposed between the inner body inner race and the outer body outer race so as to form a bearing and a seal is disposed between the inner and outer bodies and is spaced axially from the bearing. The seal includes a substantially rigid, generally annular body disposed about the inner body second outer surface section and has an inner circumferential surface with an inside diameter greater than the outside diameter of the second surface section so as to define a generally annular clearance gap between the seal inner surface and the inner body outer surface section. The seal body is formed of carbon, a ceramic material or a high-temperature polymeric material.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 a combination bearing and seal assembly 10 for a shaft 1 rotatable about a central axis $A_C$. Preferably the shaft 1 is a high speed engine shaft disposed within a frame or housing 2 of a machine, such as for example, a gas turbine, a steam turbine, a compressor or similar devices and is preferably configured to operate in a relatively high temperature environment, for example, ambient conditions greater than one hundred degrees Celsius (100° C.). The combination bearing and seal assembly 10 basically comprises a generally tubular inner body 12 providing a bearing inner race 13 and a seal engagement or "runner" surface 15, a generally tubular outer body 14 disposed about the inner body 12 and providing a bearing outer race 17, a plurality of rolling elements 16 disposed between the inner and outer races 13, 17 so as to form a bearing 18, and a seal 20 disposed between the two bodies 12, 14 and sealable about the inner body engagement/runner surface 15. By having the bearing inner race 13 and the seal engagement/runner surface 15 provided on the same or common inner body 12, radial misalignment between the bearing 18 and the seal 20 is substantially eliminated, as described in greater detail below.

Figure 1:
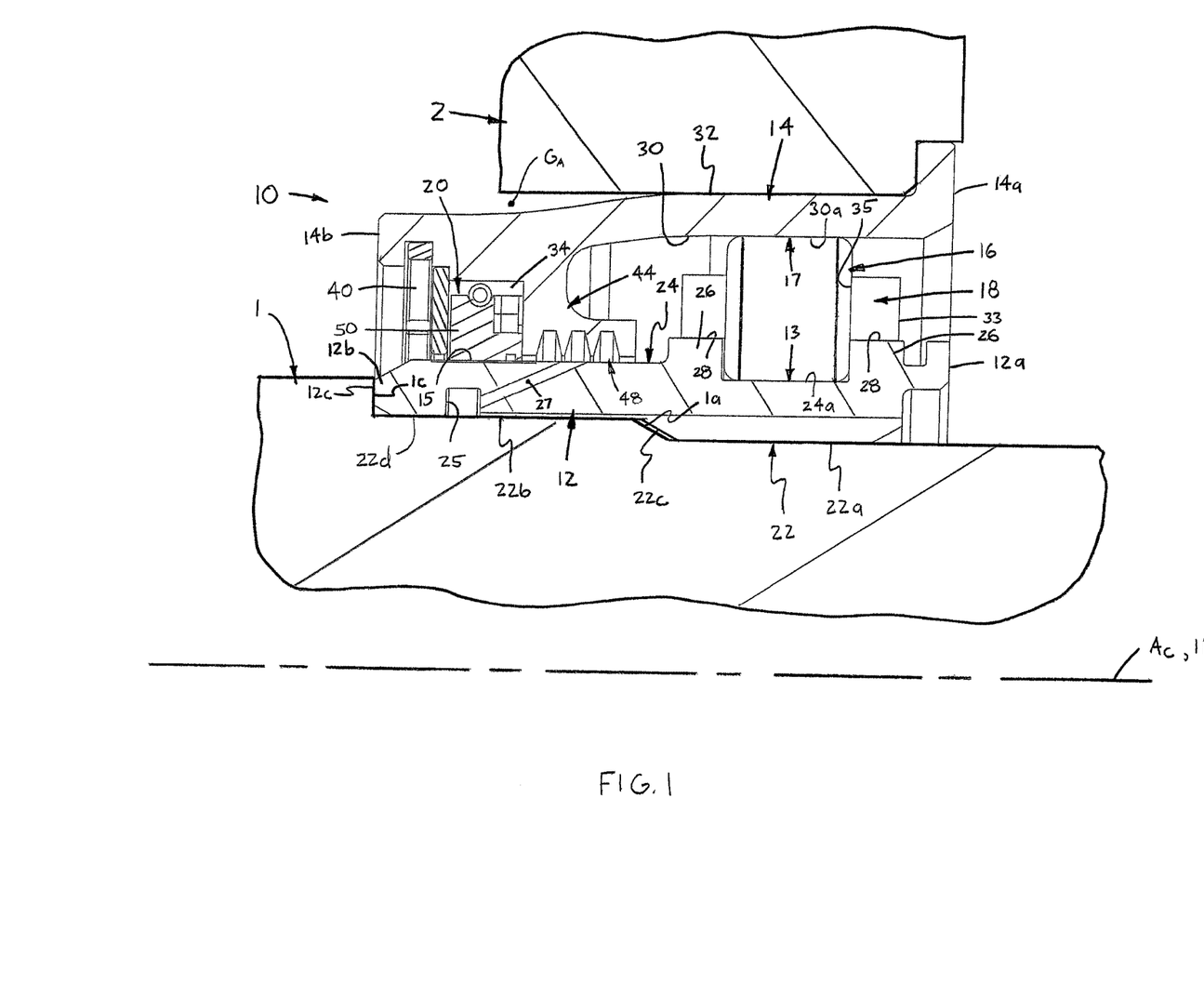
FIG. 1 is a broken-away, axial cross-sectional view of a combination bearing and seal assembly in accordance with the present invention, shown mounted on a shaft and within a machine frame.
Figure 2:
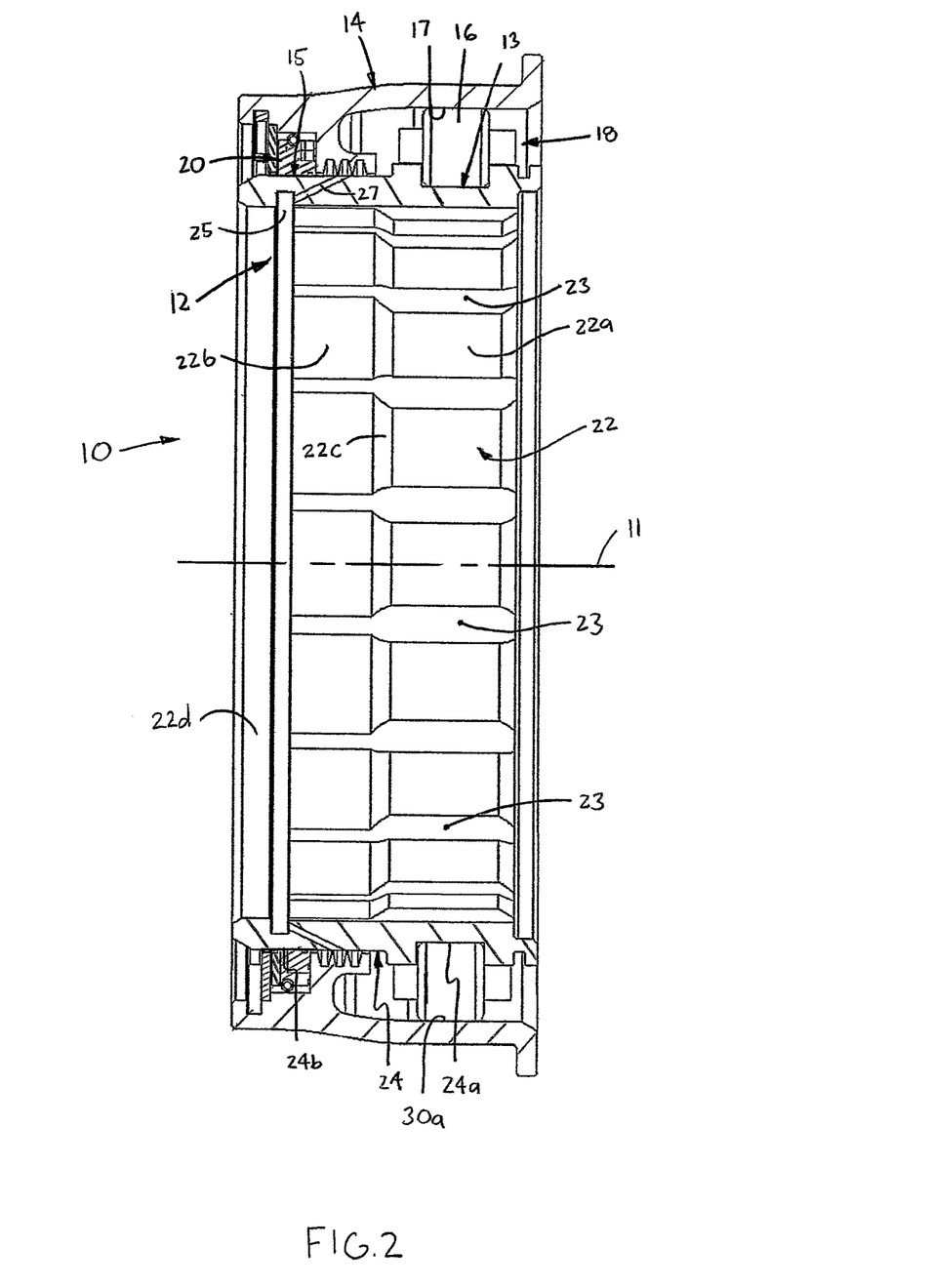
FIG. 2 is an axial cross-sectional view of the combination bearing and seal assembly, shown separate from the shaft and frame.
Figure 3:
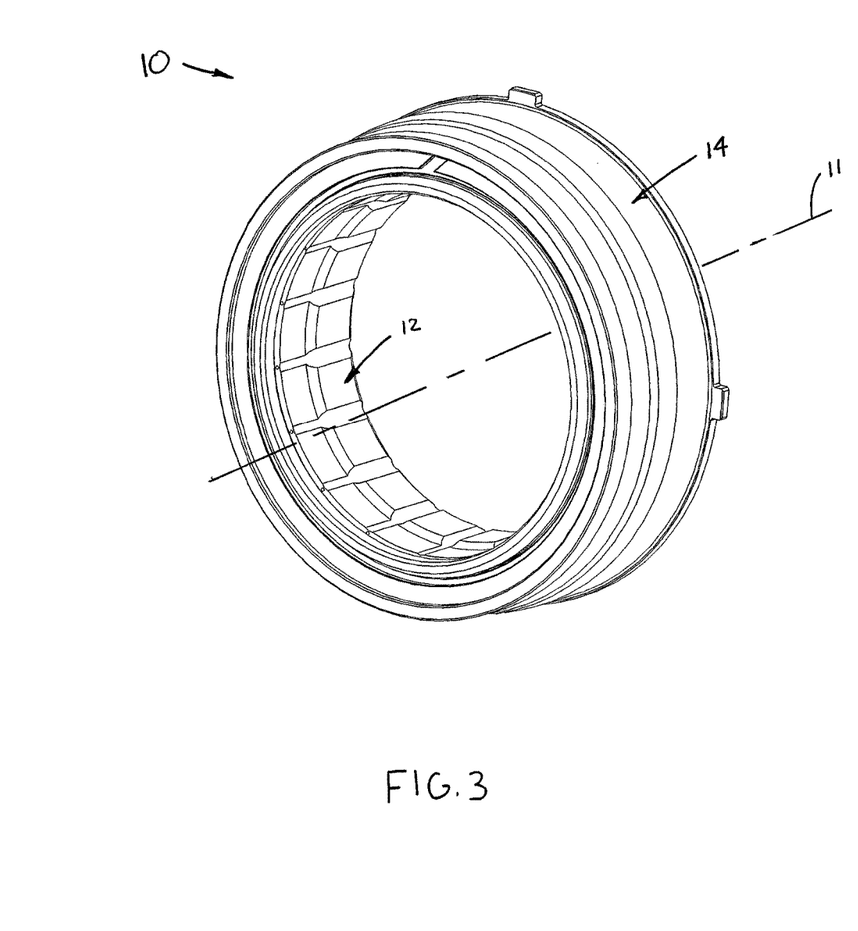
FIG. 3 is a perspective view of the combination bearing and seal assembly.
Figure 4:
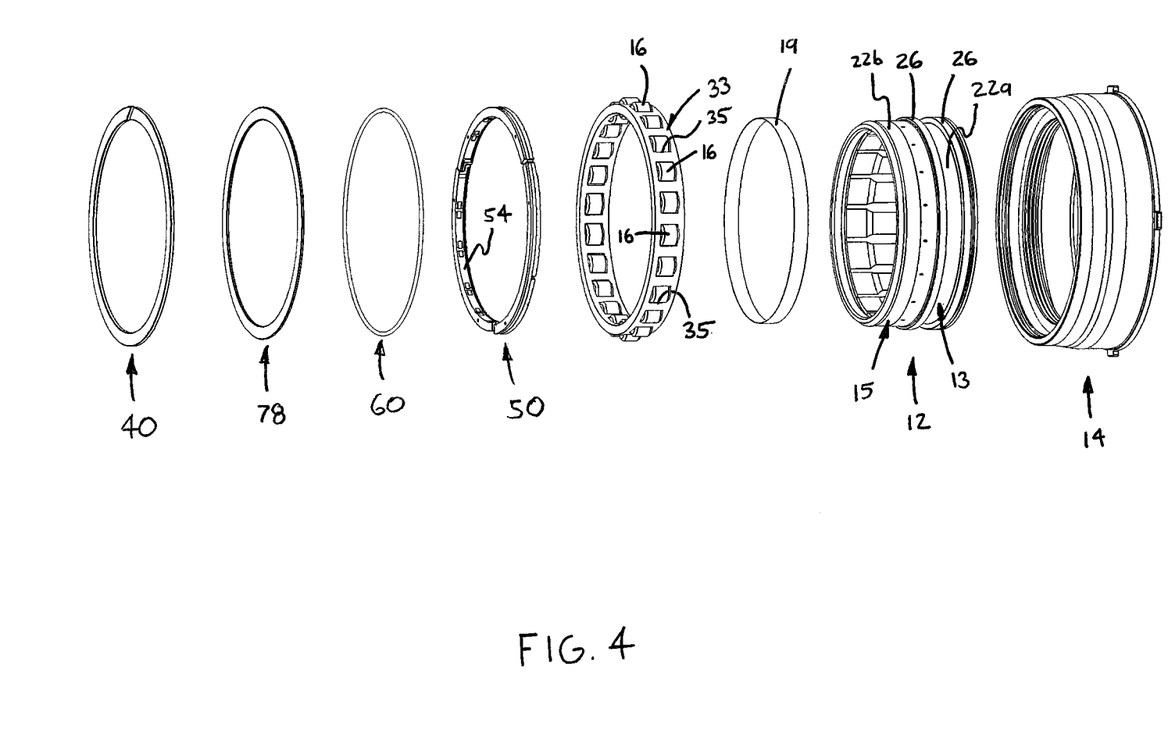
FIG. 4 is an exploded view of the combination bearing and seal assembly.
Figure 5:
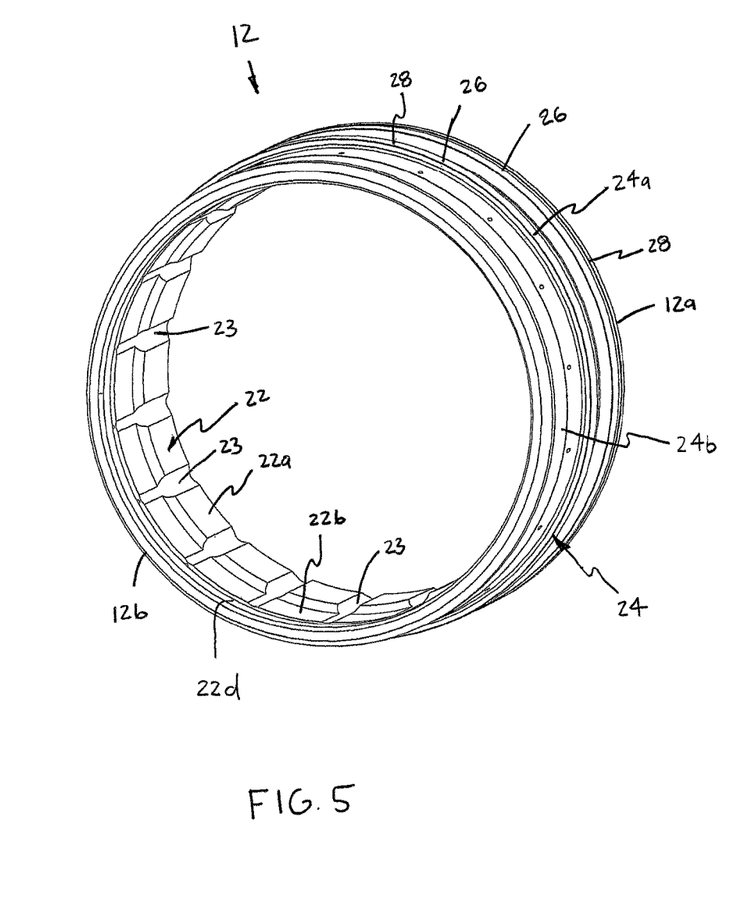
FIG. 5 is a perspective view of a tubular inner member of the combination bearing and seal assembly.
Figure 6:
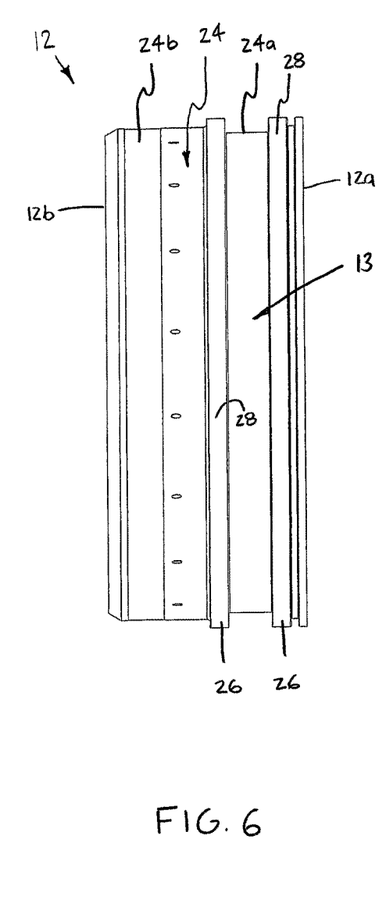
FIG. 6 is a side plan view of the tubular inner member.
Figure 7:
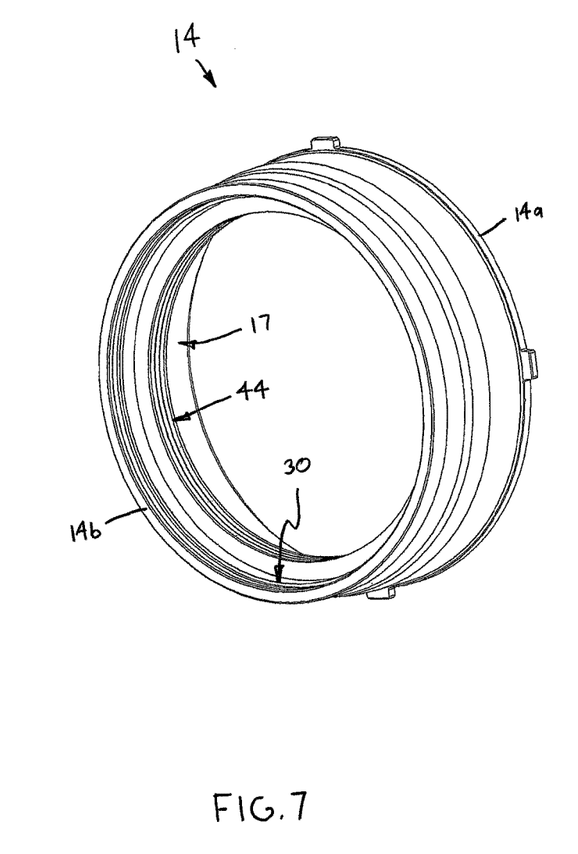
FIG. 7 is a perspective view of a tubular outer member of the combination bearing and seal assembly.
Figure 8:
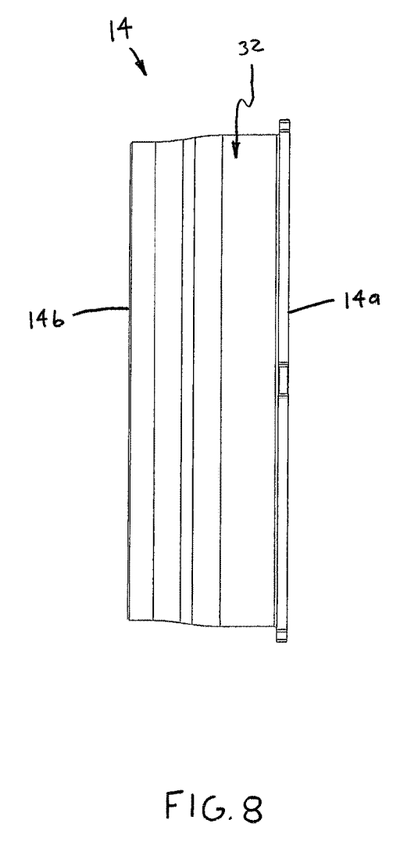
FIG. 8 is a side plan view of the tubular outer member.

Referring to FIGS. 1-6, the tubular inner body 12 has a centerline 11 and is disposable about and coupleable with the shaft 1 so as to be rotatable about the central axis $A_C$, as shown in FIG. 1. Preferably, the inner body 12 is generally circular tubular and has opposing axial ends 12a, 12b, an inner circumferential surface 22 defining a bore and an opposing outer circumferential surface 24. The inner body outer surface 24 includes a first outer circumferential surface section 24a providing the inner bearing race 13 and a second outer circumferential surface section 24b spaced axially from the first outer surface section and providing the seal engagement or runner surface 15. Preferably, the seal engagement/runner surface 15 includes a wear-resistant hard coat 19 (e.g., tungsten carbide, etc.) to reduce friction and thereby wear on the seal 20, but may alternatively be formed solely by the material of the tubular inner body 12, as discussed below.

Further, the tubular inner body 12 also preferably includes a pair of generally annular shoulders 26 located on each axial side of the inner race 13 and extending radially outwardly from the outer surface 24 and circumferentially about the central axis 11. The shoulders 26 each have an outer circumferential surface 28 for supporting a bearing cage 33 during rotation of the bearing 18, as discussed below Referring to FIGS. 1, 2, 9, 10 and 13, the inner surface 22 of the tubular inner body 12 is preferably "stepped" so as to have a radially-smaller section 22a located generally inwardly of the bearing inner race 13, a radially-larger section 22b located generally inwardly of the seal engagement surface 15 and an angled shoulder section 22c extending between the radially-smaller and radially larger sections 22a, 22b. Preferably, the tubular inner body 12 is axially secured on the shaft 1 by engaging a radial end surface 12c on one end 12b with a corresponding shoulder surface 1b on the shaft 1, as shown in FIG. 1, so as to reduce or substantially prevent vibration within the bearing 18. Further, the inner surface 22 preferably also has a plurality of axial grooves 23 extending radially inwardly from each surface section 22a, 22b to provide flow paths for cooling fluid, such as for example oil, beneath the bearing 18 and the seal 20.

Furthermore, the tubular inner body 12 also preferably has a generally annular, circumferential groove 25 and at least one and preferably a plurality of passages 27 extending between the groove 25 and the outer surface 24. The circumferential groove 25 extends radially outwardly from the inner surface 22, circumferentially about the central axis $A_C$ and is spaced inwardly from the seal engagement/runner surface 15, and is provided to circulate cooling fluid circumferentially beneath the seal runner 15. As indicated in FIGS. 10 and 13, the passage(s) 27 each have an inlet 27a at the groove 25 and an outlet 27b at the body outer surface 24 and preferably extend both radially and axially, for reasons discussed below.

Referring now to FIGS. 1-4, 7-10 and 13, the tubular outer body 14 is also preferably generally circular tubular and is disposed generally coaxially about the inner body 12, and is preferably engageable within a bore of a frame or housing 2, but may alternatively be connected at one or both axial ends to other supporting structure (none shown). The outer body 14 has opposing axial ends 14a, 14b and opposing inner and outer circumferential surfaces 30, 32, respectively. The outer body inner surface 30 includes an inner circumferential surface section 30a spaced radially outwardly from the inner body first inner surface section 24a and providing the bearing outer race 17. Preferably, the outer surface 32 of the tubular outer body 14 tapers radially inwardly from a radially-larger section adjacent to the first axial end 14a to a radially-smaller section adjacent to the second axial end 14b so as to provide an air gap $G_A$ about the outer body section enclosing the seal 20, as best shown in FIG. 1.

Referring to FIGS. 1, 9, 10 and 12, the tubular outer body 14 is preferably configured to provide a housing 34 for receiving the seal 20 so as to maintain the seal 20 axially aligned with the engagement/runner surface 15. Specifically, the inner surface 30 of the tubular outer body 14 preferably has an inner circumferential surface section 36 spaced radially outwardly from the seal 20, and axially from the outer race 17, and a radial retainer surface 38 extending inwardly from the inner surface 30 adjacent to one axial end 36a of the inner surface section 36. The inner surface section 36 and radial surface 38 form a generally annular "pocket" for receiving the seal 20. Further, the bearing and seal assembly 10 preferably further comprises a generally annular retainer member 40 coupleable with the outer body 14 adjacent to the other end 36b of the inner surface section 36. As such, the seal 20 is disposed generally axially between the retainer member 40 and the outer body radial retainer surface 38, and is constrained radially by the inner surface section 36. Preferably, the retainer plate 40 is formed generally as a C-clip and is received within an annular groove 42 extending radially outwardly from the outer body inner surface 30.

Figure 9:
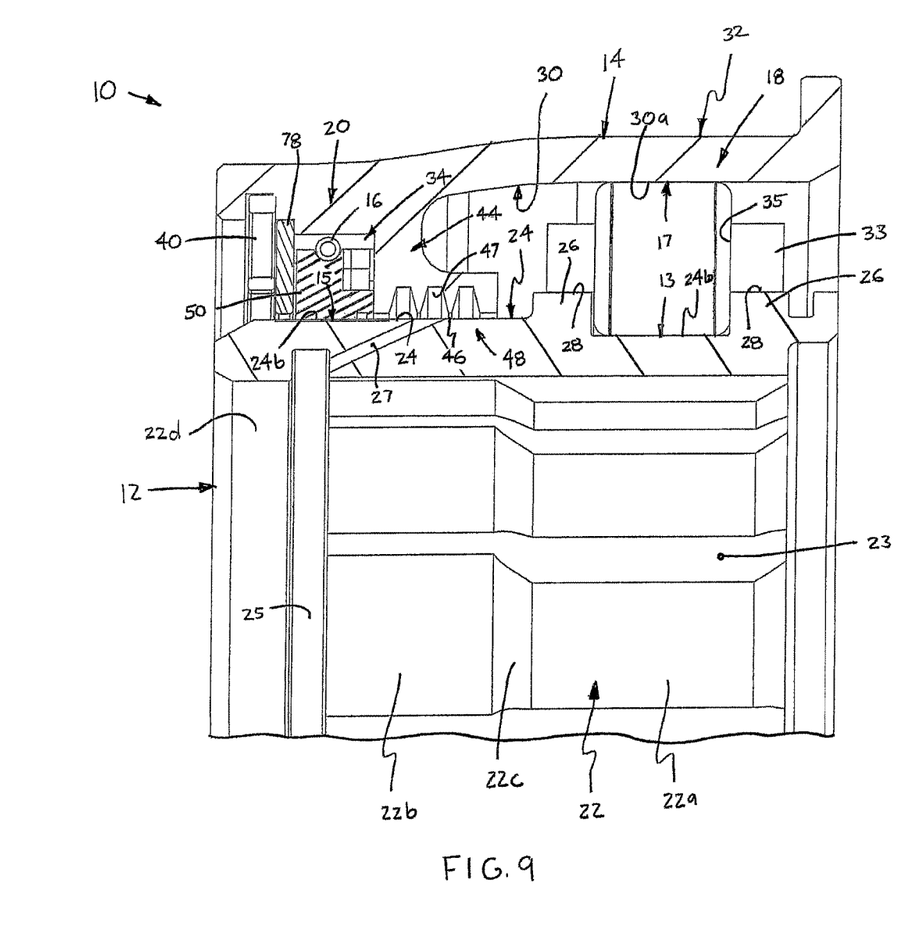
FIG. 9 is an enlarged, broken-away view of a portion of FIG. 2.
Figure 10:
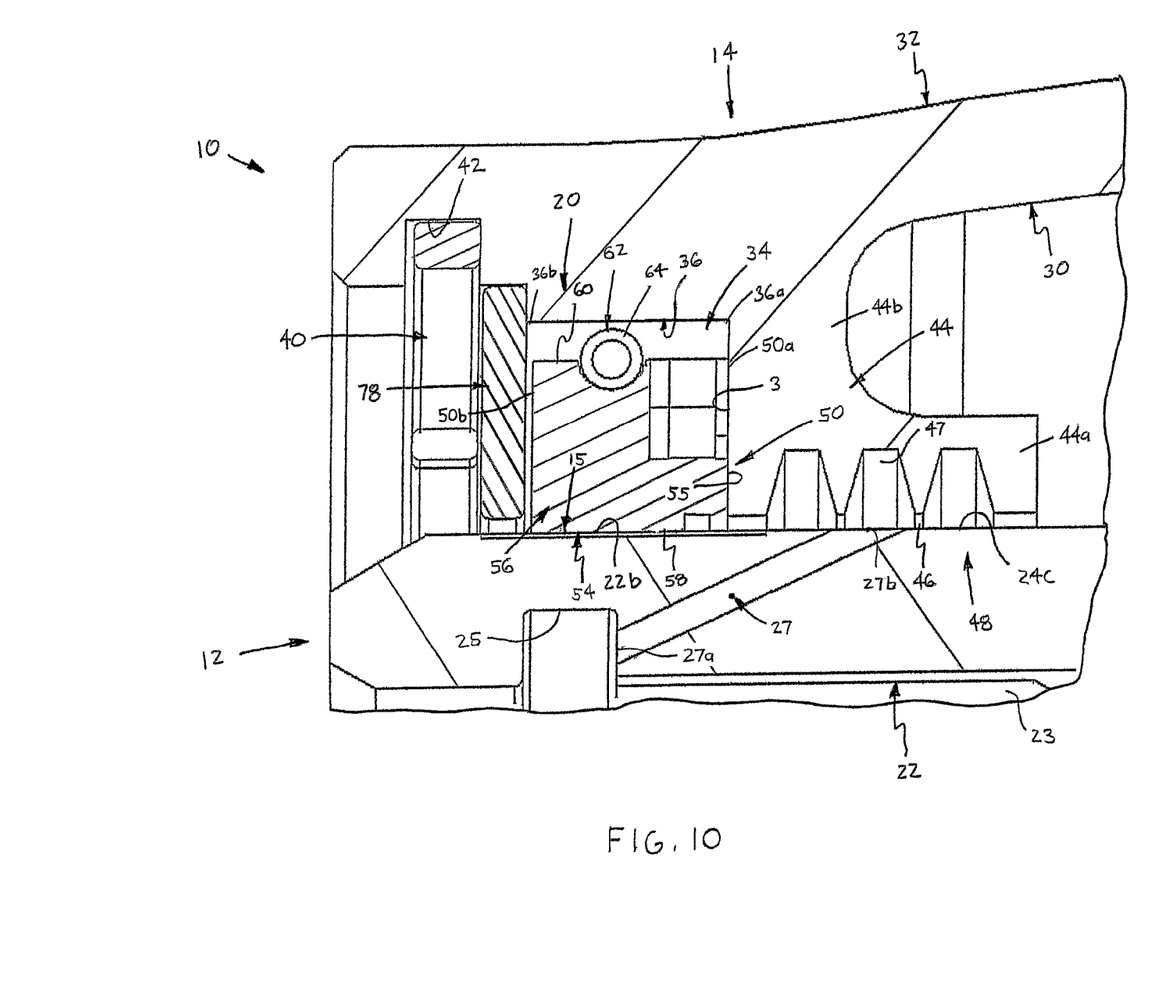
FIG. 10 is a greatly enlarged, broken-away view of a portion of FIG. 9.
Figure 13:
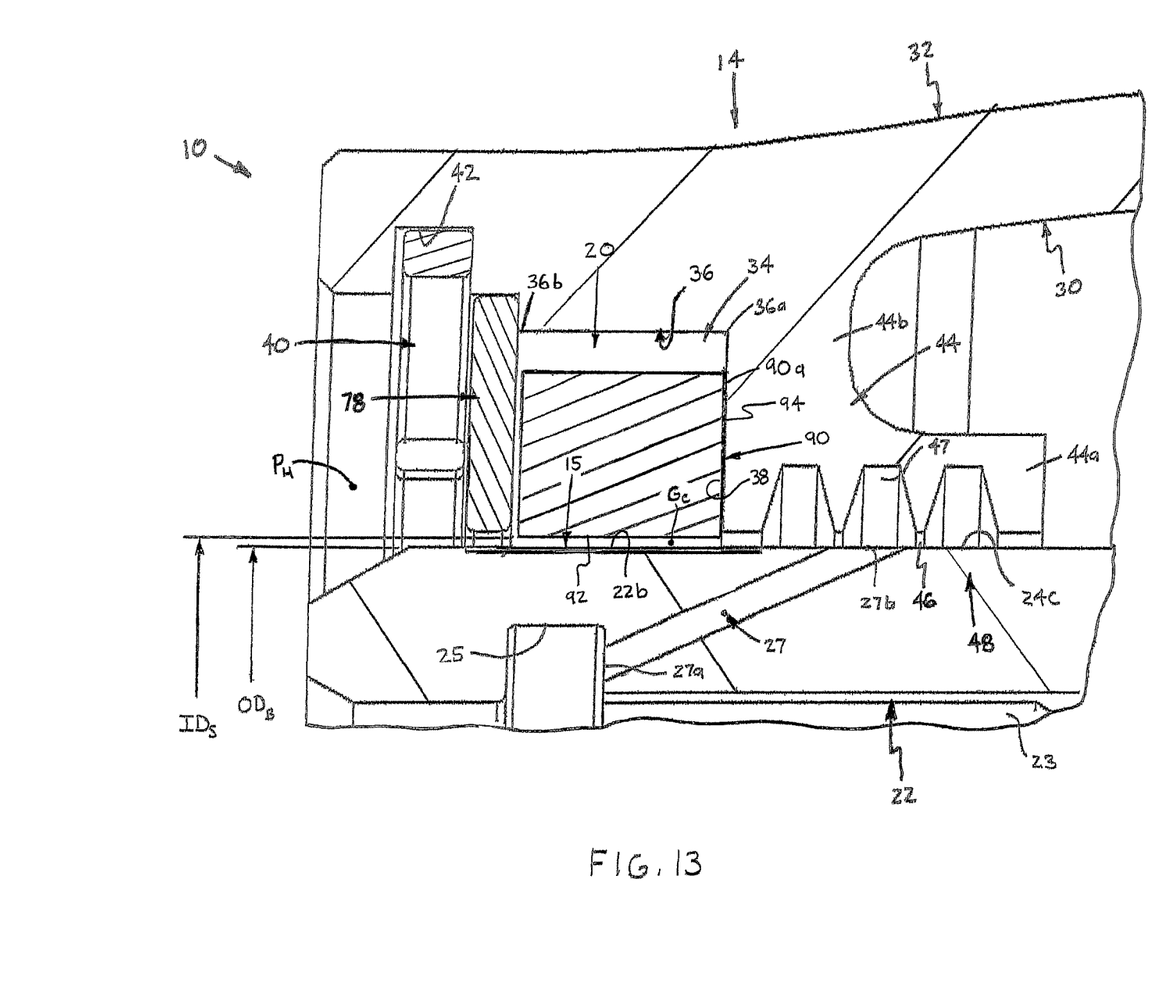
FIG. 13 is another more enlarged, broken-away view of a portion of FIG. 2, showing an alternative seal design.

Referring to FIGS. 9, 10 and 13, the tubular outer body 14 preferably further includes a generally annular projection 44 extending radially inwardly from a remainder of the outer body 14 and providing the radial retainer surface 38 described above. The projection 44 has at least one inner circumferential surface section 46 spaced radially outwardly from an outer surface section 24c of the tubular inner body 12 at a location generally between the inner race 13 and the engagement/runner surface 15, and is configured to provide a labyrinth seal 48. Preferably, the projection 44 has a single, threaded inner surface 46 extending circumferentially and axially for a plurality of turns and a single, spiral groove 47 between the "turns" of the inner surface 46. As such, any fluid entering within the groove 47 is directed by an "augering" action generally axially away from the seal 20 and toward the bearing 18 during rotation of the shaft 1.

However, the projection 44 may instead be formed have a plurality of separate surface sections 46 and separate grooves 47 located between adjacent surface sections 46 to provide a tortuous path to substantially prevent fluid flow toward the seal 20. Preferably, the projection inner surface(s) 46 is/are located radially outwardly of the outlets 27b of the inner body passages 27, such that cooling fluid circulating from the inner groove 25 is directed generally toward the bearing 20 by the labyrinth seal 48 during rotation of the shaft 1 and inner body 12. Further, the projection 44 is preferably generally "L-shaped" with an inner cylindrical section 44a providing the inner surface 46 and the groove(s) 47 and a relatively narrow, outer web section 44b extending between the cylindrical section 44a and the remainder of the tubular body 14, but may have any other appropriate shape, such as for example, substantially circular cylindrical or annular with an inner surface having a groove or grooves extending outwardly from an inner bore (not shown).

Preferably, each one of the tubular inner body 12 and tubular outer body 14 is formed as a single, integral tubular body (i.e., of one-piece construction) as depicted in the drawing figures, but may alternatively be formed of two or more tubular sections (not shown) that are permanently or removably connected. Further, each of the inner and outer bodies 12, 14 is preferably formed of a bearing steel, such as for example, through-hardening carbon chromium steel (e.g., 100Cr6), high nitrogen stainless steel, etc., such that the inner race 13 is machined directly on the inner body outer surface and the outer race 17 is machined directly on the outer body inner surface 30. However, each tubular body 12 or 14 may instead be formed of any other appropriate material and/or may have annular inserts (none shown) providing the inner and outer races 13, 17.

Referring to FIGS. 1, 2, 4 and 9, the plurality of rolling elements or rollers 16 are disposed between and roll simultaneously upon the inner body inner race 13 and the outer body outer race 17 so as to form the bearing 18. Preferably, each one of the rolling elements 16 is a cylindrical roller, but may alternatively be formed as balls, needles, toroidal rollers or any other appropriate type of rolling element (none show) depending on the particular application of the bearing and seal assembly 10. Further, the bearing 18 preferably includes a generally annular cage 33 having a plurality of rectangular pockets 35, each rolling element 16 being disposed within a separate one of the pockets 35 so as to maintain a desired spacing between the rollers 16. As discussed above, the bearing cage 33 is preferably supported by the shoulders 26 of the tubular inner body 12 and slides generally upon the shoulder outer circumferential surfaces 28 during rotation of the inner body 12.

Referring now to FIGS. 1, 2, 4, 9-11 and 13, the seal 20 includes at least one and preferably a plurality of seal members 50, and is preferably a circumferentially-sealing rigid ring seal, as described in detail below. The seal 20 is disposed between the inner and outer bodies 12, 14 and is spaced axially from the bearing 18. The one or more seal members 50 each have an inner circumferential sealing surface section singly or collectively providing a sealing surface 54 (i.e., with a single member 50, the entire inner surface section provides the sealing surface 54), and opposing axial ends 50a, 50b. The sealing surface 54 is sealingly engageable with the inner body seal engagement surface 15 when the inner body 12 is generally stationary with respect to the central axis $A_C$, in other words, when the machine is in a static state with a non-rotational shaft 1. Further, the radial surface 55 of one axial end 50a of the seal member(s) 50 is sealingly engageable with the radial retainer surface 38 of the tubular outer body 14 so as to prevent fluid flow between the seal 20 and the outer body 14, as discussed in further detail below.

Furthermore, the seal 20 is preferably configured to displace generally radially outwardly so as to be spaced from the inner body engagement surface 15 when the inner body 12 rotates about the central axis $A_C$, i.e., the machine is in an operational or "dynamic" state with the shaft 1 being rotational, to thereby reduce friction and wear on the seal 20. However, the one or more seal members 50 may alternatively be configured such that the sealing surface 54 remains generally juxtaposed against, or fixedly spaced from, the inner body engagement/runner surface 15, as described in further detail below. Also, although only one seal 20 is depicted and described herein, the combination bearing and seal assembly 10 may include two seals 20 (only one shown) disposed axially adjacent to each other and sealing about the same or adjacent inner body seal engagement/runner surface(s) 15 (only one shown) in the manner of a "dual ring" seal.

Preferably, each one of the preferred plurality of seal members 50 is an arcuate seal "ring" segment 56 having opposing inner and outer circumferential surfaces 58, 60, respectively, and opposing first and second circumferential ends 56a, 56b, respectively. The inner surfaces 58 of the plurality of seal segments 56 collectively form the seal inner circumferential sealing surface 54, as discussed above. Further, the seal member segments 56 are arranged such that the first circumferential end 56a of each one of the plurality of segments 56 is disposed adjacent to, and is preferably engageable with, the second circumferential end 56b of an adjacent one of the plurality of seal member segments 56, thus collectively forming the annular seal 20. Furthermore, the seal 20 also preferably includes a biasing member 62 configured to bias the plurality of arcuate segments 56 generally radially inwardly toward the inner body engagement/runner surface 15. The biasing member 62 is preferably a circular garter spring 64 disposed circumferentially about the outer surface 60 of each one of the segments 56 and maintains contact between the seal surface 54 and the inner body engagement/runner surface 15.

Figure 11:
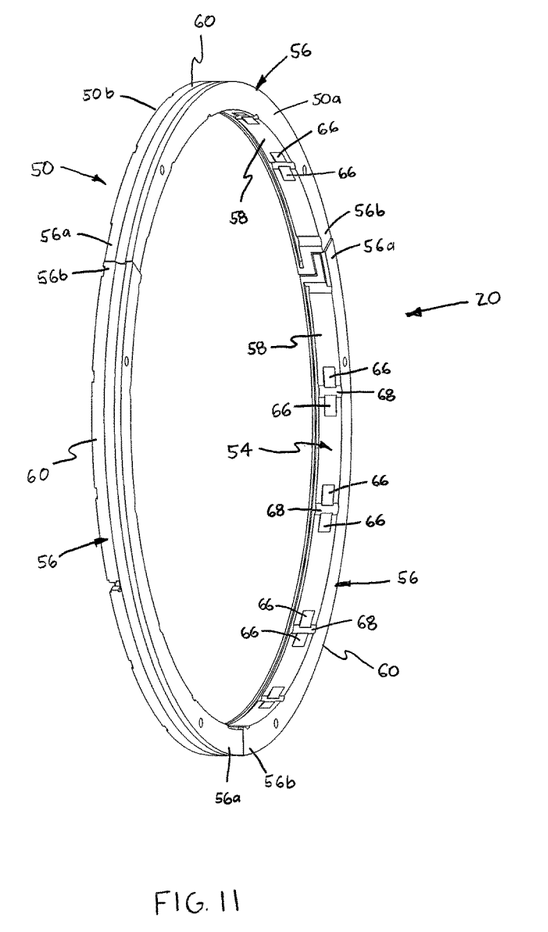
FIG. 11 is a perspective view of a preferred construction of a seal of the combination bearing and seal assembly.

As best shown in FIG. 11, each one of the arcuate seal segments 56 preferably has at least one and most preferably a plurality of lift ramps 66 each formed on the segment inner surface 58. Each lift ramp 66 is configured to generate a radially-outwardly directed lifting force on the arcuate segment 56 when the tubular inner body 12 rotates about the central axis $A_C$. As such, the lifting force displaces the segment 56 generally radially outwardly from the inner body engagement surface 15 to reduce friction between the seal 20 and the inner body 12 during dynamic operating conditions. Further, each seal segment 56 preferably has at least one axial passage 68 for directing fluids into each lift ramp 66, although different or additional means for directing fluids into the ramps 66 may be provided.

As lifting ramps on "circumferential ring" seals, or on the runners of such seals, are known by those skilled in the relevant sealing art, a detailed description of the structure and operation of such ramps is beyond the scope of the present disclosure. However, it should be noted that each lifting ramp 66 may be configured to be "uni-directional" (not shown), such that lifting force is generated only when the inner body 12 is rotating in one angular direction about the central axis $A_C$, or may be "bi-directional" as depicted in FIG. 11, so as to generate lift in either rotational direction of the inner body 12. Such bi-directional lift ramps 66 are preferably generally similar to those disclosed in U.S. Patent Application No. 20150167846A1, the entire contents of which is incorporated by reference herein.

Although one presently preferred construction of the seal 20 is formed of arcuate segments 56 which include one or more lift ramps 66 formed on each segment 56, as described above and depicted in FIG. 11, the arcuate segments 56 may alternatively be formed without any lift ramps. In such cases, the tubular inner body 12 may have an engagement/runner surface 15 with lift ramps (not depicted) formed therein to generate fluid pressure to displace the seal segments radially-outwardly from the seal engagement surface or runner 15. As a further alternative, both the seal arcuate segments 56 and the seal engagement surface 15 may be formed without any lift ramps, in which case the segment inner surfaces 58 remain generally juxtaposed against the engagement/runner surface 15 in both static and dynamic states of the machine. Such a seal 20 is capable of "expanding" to accommodate expansion of the shaft 1, but has greater friction than the preferred seal 20 with the capability of displacing radially-outwardly from the shaft 1 during dynamic operating conditions.

Referring particularly to FIG. 13, in another alternative construction, the seal 20 may be formed as a "floating bushing" seal including a generally annular, substantially rigid body 90 having an inner circumferential surface 92 with an inside diameter $ID_S$ sized greater than the outside diameter $OD_B$ of the engagement/runner surface 15 of the tubular inner body 12. As such, a generally annular clearance gap $G_C$ is defined between the seal inner surface 92 and the inner body outer surface 15, which permits a certain volume of fluid to pass through the seal/inner body interface while retaining the majority of the fluid on the high pressure side $P_H$ of the seal 20. Also, the seal body inner surface 92 is sized relative to the engagement/runner surface 15 such that the clearance gap $G_C$ is present both under static and dynamic operating conditions, i.e. when the shaft 1 has thermally expanded. As with the segmented seal constructions described above, the annular body 90 has a radial sealing surface 94 on one axial end 90a that is sealingly engageable with the radial retainer surface 38 of the tubular outer body 14. Further, the floating seal annular body 90 may be of one-piece construction, including being either a solid ring or a split ring, or may be formed of a plurality of coupled body sections or segments forming a generally solid ring when connected.

Preferably, each arcuate ring segment 56 or the annular body 90 is formed of a carbon material, such as graphite, graphene, etc., a ceramic material, or a high temperature polymeric material, but may alternatively be formed of any other appropriate material. Further, although the seal 20 is preferably formed of a plurality of segments 56 or as the "floating" rigid annular body 90, the seal 20 may alternatively formed in any other appropriate manner that enables the bearing and seal assembly 10 to function as generally described herein.

Figure 12:
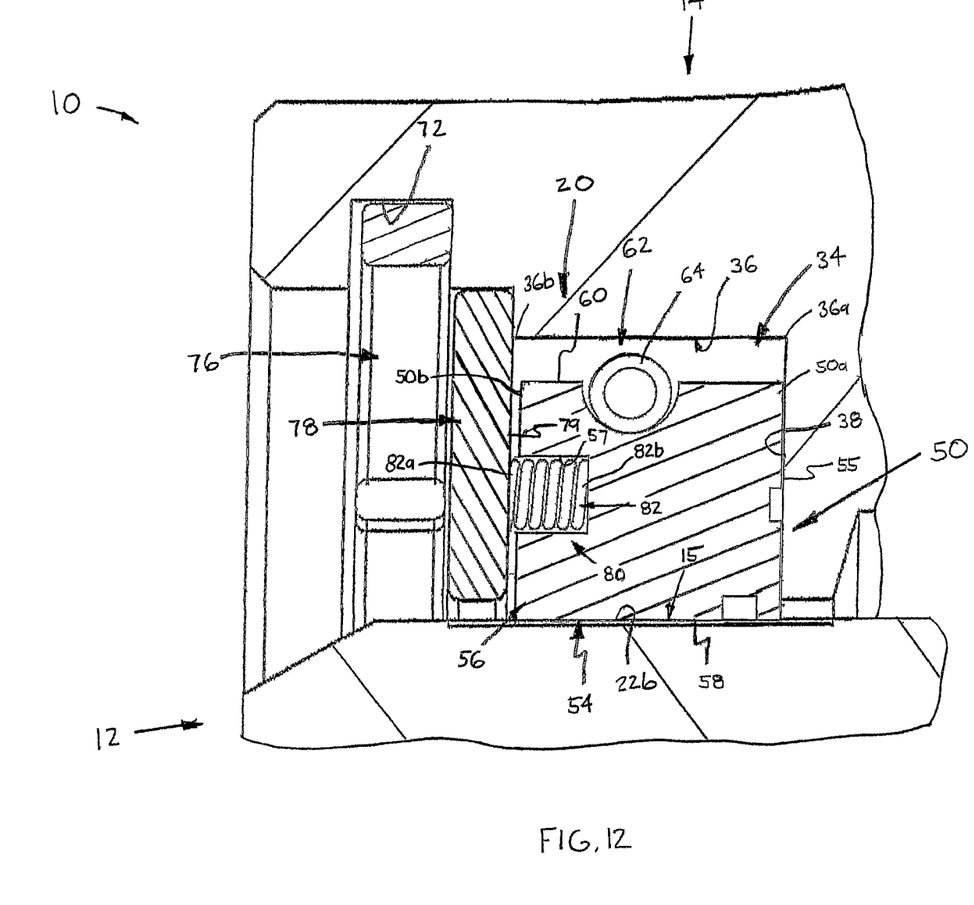
FIG. 12 is a more enlarged, broken-away axial cross-sectional view of the bearing and seal assembly taken through a spring of the seal.

Referring to FIGS. 1, 9, 10 and 12, the seal 20 preferably further includes a generally annular "spring" plate 78 and at least one and preferably a plurality of springs 80 (only one shown, FIG. 12) configured to bias the seal member(s) 50 or the annular body 90. The spring plate 78 is disposed between the seal member(s) 50 and the retainer member 76 and has a radial surface 79 facing generally toward the seal member 50 or annular body 90. Each spring 80 extends generally between the plate 78 and the at least one seal member 50 or body 90. The one or more springs 80 are configured to bias the at least one seal member 50 or the body 90 generally axially toward the radial retainer surface 38 of the tubular outer body 14 so as to prevent fluid flow between the seal 20 and the outer body 14. Preferably, each spring 80 includes a compression coil spring 82 having a first end 82a disposed against the spring plate 78 and a second end 82b disposed within a pocket 57 extending axially into a separate one of the arcuate seal segments 56, as shown in FIG. 12, or within the annular body 90 (not shown). However, the spring(s) 80 may be constructed in any other appropriate manner capable of biasing the seal 20 axially against the radial retainer surface 38, such as for example as a wave spring (not shown).

The combination bearing and seal assembly 10 has a number of advantages over previously-known separate bearings and seals, particularly in high speed and high temperature applications. One problem with separate bearings and seals is that often a once per revolution radial clearance change exists between the stationary seal housing and the runner, which can be substantial (0.001-0.008 inch Peak-to-Peek) in standard seal configurations. This constant fretting motion reduces carbon seal life by wearing the critical sealing surfaces of the seal ring elements. The present combination bearing and seal assembly 10 has a reduced, and preferably substantially eliminated, radial displacement by unitizing both the seal housing 70 and the outer race 17 of the bearing 18 and the seal runner 15 and the inner race 13 of the bearing 18. In other words, combining the inner race 13 of the bearing 18 and the seal engagement surface/runner 15 on the same or "common" tubular inner body 12 improves the alignment of the runner surface 15 and the shaft centerline $A_C$.

Previously known assemblies with a separate seal runner and bearing race increases seal runner misalignment due to parallelism variations in the "clamp stack". In the present combination bearing and seal assembly 10, the unitized seal runner 15 and bearing inner race 13 results in only one parallelism stack-up. The same alignment benefit applies to a unitized seal housing 34 and outer race 17 each being provided on a single or common tubular outer body 14. Further, the simultaneous machining of the bearing 18 and seal 20 components increases manufacturing precision, efficiency and reduces costs. The combination bearing/seal assembly 10 also makes assembly easier by reducing the number of steps and tools required to install the seal and bearing components into the assembly 10. Furthermore, as the tribological challenges for both bearings and seals are very similar in gas turbine operating environments, bearing material heat treatments and surface property enhancements may be used to produce both the bearing 18 and the seal 20 structural features of the combination bearing and seal assembly 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein and in the appended claims.

We claim:

1. A combination bearing and seal assembly for a shaft, the shaft being rotatable about a central axis, the bearing and seal assembly comprising:
    a generally tubular inner body disposable about and coupleable with the shaft so as to be rotatable about the central axis and having an outer circumferential surface including a first outer circumferential surface section providing an inner bearing race and a second outer circumferential surface section spaced axially from the first outer surface section and providing a seal engagement surface, the inner bearing race and the sealing engagement surface being formed directly on the inner body;
    a generally tubular outer body disposed generally coaxially about the tubular inner body and having an inner circumferential surface including a surface section spaced radially outwardly from the inner body outer surface and providing a bearing outer race and an annular projection extending radially inwardly from the inner circumferential surface and spaced axially from the bearing outer race, the projection providing a radial retainer surface;
    a plurality of rolling elements disposed between the inner body inner race and the outer body outer race so as to form a bearing; and
    a generally annular seal disposed between the inner and outer bodies and spaced axially from the bearing, the seal including a plurality of generally arcuate segments, each arcuate segment having an inner circumferential surface, an opposing outer circumferential surface, a first circumferential end and an opposing second circumferential end, the first circumferential end of each one of the plurality of seal segments being disposed adjacent to the second circumferential end of an adjacent one of the plurality of seal members, the inner surfaces of the plurality of segments collectively forming an inner circumferential sealing surface sealingly engageable with the inner body seal engagement surface, the plurality of seal segments being configured to displace generally radially outwardly so as to be spaced from the engagement surface when the inner body rotates about the central axis at a rotational speed sufficient to generate a lifting force on each one of the plurality of seal segments, each arcuate segment being slidably displaceable against and sealingly engageable with the radial retainer surface of the outer body projection so as to prevent fluid flow between the seal and the tubular outer body.

2. The bearing and seal assembly as recited in claim 1 wherein the tubular outer body is configured to provide a housing for the seal.

3. The bearing and seal assembly as recited in claim 1 wherein the tubular inner body further has an inner circumferential surface, a generally annular groove extending radially outwardly from the inner circumferential surface and spaced inwardly from the seal engagement surface section and at least one passage extending between the groove and the outer circumferential surface of the tubular inner body and configured to direct fluids from the groove and generally toward the bearing.

4. The bearing and seal assembly as recited in claim 1 further comprising a biasing member configured to bias the plurality of arcuate segments generally radially inwardly toward the inner body engagement surface.

5. The bearing and seal assembly as recited in claim 1 wherein each arcuate segment is formed of one of a carbon material, a ceramic material and a polymer material.

6. The bearing and seal assembly as recited in claim 1 wherein each of the arcuate seal segments has at least one lift ramp formed on the segment inner surface and configured to generate a radially outwardly directed lifting force on the arcuate segment when the inner body rotates about the central axis to displace the segment generally radially outwardly from the inner body engagement surface.

7. The bearing and seal assembly as recited in claim 1 wherein each one of the inner and outer tubular bodies includes a single tubular body.

8. The bearing and seal assembly as recited in claim 1 wherein
    the bearing and seal assembly further comprises a generally annular retainer member coupleable with the outer body such that the seal is disposed generally axially between the retainer member and the outer body radial retainer surface.

9. The bearing and seal assembly as recited in claim 8 further comprising a generally annular plate disposed between the seal and the retainer plate and having a radial surface and a plurality of springs extending between the plate and the at least one seal member, each one of the plurality of springs being configured to bias the at least one seal member generally axially toward the outer body radial retainer surface.

10. The bearing and seal assembly as recited in claim 1 wherein the annular projection of the tubular outer body has at least one inner circumferential surface section spaced radially outwardly from an outer surface section of the tubular inner body so as to provide a labyrinth seal.

11. A combination bearing and seal assembly for a shaft, the shaft being rotatable about a central axis, the bearing and seal assembly comprising:
    a generally tubular inner body disposable about and coupleable with the shaft so as to be rotatable about the central axis and having an outer circumferential surface including a first outer circumferential surface section providing an inner bearing race and a second outer circumferential surface section spaced axially from the first outer surface section and having an outside diameter;

a generally tubular outer body disposed generally coaxially about the inner body and having an inner circumferential surface including a surface section spaced radially outwardly from the inner body outer surface and providing a bearing outer race and an annular projection extending radially inwardly from the inner circumferential surface and spaced axially from the bearing outer race, the projection providing a radial retainer surface;

a plurality of rolling elements disposed between the inner body inner race and the outer body outer race so as to form a bearing; and a seal disposed between the inner and outer bodies and spaced axially from the bearing, the seal including a rigid, generally annular one-piece body disposed about the inner body second outer surface section and having an inner circumferential surface with an inside diameter greater than the outside diameter of the second surface section so as to define a generally annular clearance gap between the seal inner surface and the inner body outer surface section, the seal body being formed of one of carbon, a ceramic material and a polymeric material and being disposed against and sealingly engageable with the radial retainer surface of the outer body projection so as to prevent fluid flow between the seal and the tubular outer body.

12. A combination bearing and seal assembly for a shaft, the shaft being rotatable about a central axis, the bearing and seal assembly comprising:

a generally tubular inner body disposable about and coupleable with the shaft so as to be rotatable about the central axis and having an outer circumferential surface including a first outer circumferential surface section providing an inner bearing race and a second outer circumferential surface section spaced axially from the first outer surface section and providing a seal engagement surface, the inner bearing race and the sealing engagement surface being formed directly on the inner body;

a generally tubular outer body disposed generally coaxially about the tubular inner body and having an inner circumferential surface including a surface section spaced radially outwardly from the inner body outer surface and providing a bearing outer race;

a plurality of rolling elements disposed between the inner body inner race and the outer body outer race so as to form a bearing; and a generally annular seal disposed between the inner and outer bodies and spaced axially from the bearing, the seal including a plurality of generally arcuate segments, each arcuate segment having an inner circumferential surface, an opposing outer circumferential surface, a first circumferential end and an opposing second circumferential end, the first circumferential end of each one of the plurality of seal segments being disposed adjacent to the second circumferential end of an adjacent one of the plurality of seal members, the inner surfaces of the plurality of segments collectively forming an inner circumferential sealing surface sealingly engageable with the inner body seal engagement surface, the plurality of seal segments being configured to displace generally radially outwardly so as to be spaced from the engagement surface when the inner body rotates about the central axis at a rotational speed sufficient to generate a lifting force on each one of the plurality of seal segments;

wherein the tubular inner body further has an inner circumferential surface, a generally annular groove extending radially outwardly from the inner circumferential surface and spaced inwardly from the seal engagement surface section and at least one passage extending between the groove and the outer circumferential surface of the tubular inner body and configured to direct fluids from the groove and generally toward the bearing.

* * * * *